United States Patent
Chan et al.

(10) Patent No.: US 7,656,111 B1
(45) Date of Patent: Feb. 2, 2010

(54) LOW POWER PREAMPLIFIER WRITER ARCHITECTURE

(75) Inventors: Sang Kong Chan, Singapore (SG); Kien Beng Tan, Singapore (SG); Xiao Yu Miao, Singapore (SG)

(73) Assignee: Marvell International Ltd. (BM)

( * ) Notice: Subject to any disclaimer, the term of this patent is extended or adjusted under 35 U.S.C. 154(b) by 0 days.

(21) Appl. No.: 12/186,359

(22) Filed: Aug. 5, 2008

Related U.S. Application Data

(63) Continuation of application No. 11/321,766, filed on Dec. 28, 2005, now Pat. No. 7,408,313.

(60) Provisional application No. 60/710,898, filed on Aug. 23, 2005, provisional application No. 60/717,725, filed on Sep. 15, 2005, provisional application No. 60/710,796, filed on Aug. 23, 2005.

(51) Int. Cl.
*H02P 6/06* (2006.01)

(52) U.S. Cl. .................. 318/400.06; 318/293; 318/560; 318/561; 360/46; 360/67; 360/68

(58) Field of Classification Search .................. 360/31, 360/44, 67, 68, 46; 318/400.06, 293, 434, 318/560, 561
See application file for complete search history.

(56) References Cited

U.S. PATENT DOCUMENTS

| | | | |
|---|---|---|---|
| 5,869,988 A | | 2/1999 | Jusuf et al. |
| 5,894,237 A | | 4/1999 | Brannon et al. |
| 5,986,832 A | | 11/1999 | Barnett |
| 6,121,800 A | * | 9/2000 | Leighton et al. ............. 327/110 |
| 6,222,695 B1 | * | 4/2001 | Canario ....................... 360/68 |
| 6,252,440 B1 | | 6/2001 | Sushihara et al. |
| 6,256,158 B1 | * | 7/2001 | Brown et al. .................. 360/31 |
| 6,285,221 B1 | * | 9/2001 | Leighton et al. ............. 327/110 |
| 6,297,919 B1 | * | 10/2001 | Pidutti et al. .................. 360/46 |
| 6,404,574 B1 | | 6/2002 | Barnett |
| 7,068,450 B2 | * | 6/2006 | Ngo et al. ..................... 360/46 |
| 7,190,541 B2 | * | 3/2007 | Kuehlwein et al. ............ 360/67 |
| 2004/0120065 A1 | | 6/2004 | Takeuchi |

* cited by examiner

*Primary Examiner*—Paul Ip

(57) ABSTRACT

A circuit is adapted to activate a writer head of a data storage media drive during both the boost periods as well as the steady state periods. The current supplied to the writer head during the boost periods exceeds the steady state current and flows between positive and negative voltage supplies so as to provide the required magnetic flux change in the inductor disposed in the write head. During the steady state periods, a switch circuit is turned on to provide a second current path across the writer head. During the steady state periods, the current flows between the positive voltage supply and the ground to reduce power consumption. The switch circuit is turned off during the boost periods.

20 Claims, 8 Drawing Sheets

LOW POWER PREAMPLIFIER WRITER ARCHITECTURE

CROSS-REFERENCES TO RELATED APPLICATIONS

The present application is a continuation application of commonly-assigned U.S. patent application Ser. No. 11/321,766 (now U.S. Pat. No. 7,408,313), filed Dec. 28, 2005 (which is incorporated by reference in its entirety), which claims the benefit under 35 USC 119(e) of the following applications, the contents of all of which is incorporated herein by reference in their entirety:

U.S. provisional application No. 60/710,898, filed Aug. 23, 2005, entitled "Low Power Preamplifier Writer Architecture";

U.S. provisional application No. 60/717,725, filed Sep. 15, 2005, entitled "Low Power Preamplifier Writer Architecture";

U.S. provisional application No. 60/710,796, filed Aug. 23, 2005, entitled "Switch Circuit".

BACKGROUND OF THE INVENTION

The present invention relates to electronic circuits, and more particularly to a technique for reducing power consumption of a writer head driver circuitry disposed in a data storage media driver.

FIG. 1 is a simplified transistor schematic diagram of a driver circuit 100 used to supply current to a writer head 150 via nodes Hx and Hy. FIG. 2 shows the timing characteristic of the write current $I_w$ so supplied across nodes Hx and Hy. As is seen from FIG. 2, during the boost periods, i.e., (T2–T1) or (T4–T3), current $I_w$ overshoots the steady state current $I_{wss}$ to provide the required magnetic flux change in the inductor disposed in the write head 150. This current flows, in part, either through transistor pair 102, 108, or 104, 106.

At the end of each boost period, the active transistor pair 102, 108, or 104, 106, is turned off and one of transistor pairs 112, 118, or 114, 116 is turned on so as to start and maintain the steady state operation. FIG. 3 is a timing diagram of a number of signals associated with driver circuit 100.

During the first boost period TB1, voltage signals BSTPL and BSTNL are lowered and voltage signals BSTPR and BSTNR are either raised or are maintained at previously high levels. Accordingly, transistors 102, 108 are turned on and transistors 104, 106 are turned off or maintained off. Therefore, a current path is established from supply voltage $V_{CC}$ to supply voltage $V_{EE}$ via transistors 102, 108, and writer head 150. Boost period TB1 is equal to (T2–T1).

During the second boost period TB2, voltage signals BSTPR and BSTNR are lowered and voltage signals BSTPL and BSTNL are either raised or are maintained at previously high levels. Accordingly, transistors 104, 106 are turned on and transistors 102, 108 are either turned off or maintained off. Therefore, a current path is established from supply voltage $V_{CC}$ to supply voltage $V_{EE}$ via transistors 104, 106, and writer head 150. Steady state transistors 112, 114, 116 and 118 are kept off during the boost periods TB1 and TB2. Boost period TB2 is equal to (T4–T3).

The power consumed by driver circuit 100 during the boost periods is defined by the following expression:

$$(V_{CC} - V_{EE})\left(\frac{I_{wpr} \times T_B}{T_B + T_S}\right) \quad (1)$$

where $T_B$ represents the boost duration and $T_S$ represents the steady state duration.

Positive voltage $V_P$ is generated from positive supply voltage $V_{CC}$. Similarly, negative voltage $V_N$ is generated from negative supply voltage $V_{EE}$. Therefore, the power consumed by driver circuit 100 during the steady state periods is defined by the following expression:

$$(V_{CC} - V_{EE})\left(\frac{I_{wss} \times T_S}{T_B + T_S}\right) \quad (2)$$

As is known, the steady state typically has a much longer duration than the boost period. Consequently, driver circuit 100 has a relatively high power consumption during the steady state periods.

BRIEF SUMMARY OF THE INVENTION

In accordance with the present invention, a driver circuit adapted to supply current to a writer head includes, in part, an H-bridge and a switch circuit. The H-bridge includes, in part, a first leg coupled between first and second reference voltages and adapted to source (supply) current to a first node or to sink (draw) current from the first node during a steady state period. The second leg is also coupled between the first and second reference voltages and is adapted to source current to a second node or sink current from the second node during the steady state period. The writer head is disposed between the first and second nodes and provides a first current path therebetween. The switch circuit is also coupled between the first and second nodes and is adapted to establish a second current conduction path between the first and second nodes during the steady state period. During boost cycles, the switch circuit is turned off to inhibit current flow in the second current path. In one embodiment, the first reference voltage is supplied by a positive voltage supply, and the second reference voltage is supplied by a negative voltage supply.

In one embodiment, the first leg further includes, in part, a current source, a PMOS transistor having first and second terminals coupled to the current source and the first node, a first NMOS transistor having a first terminal coupled to the first node and a second terminal coupled to a third node, and control circuitry coupled between the third node and the ground terminal and adapted to inhibit junction diodes of the first NMOS transistor from conducting current during boost cycles. The second leg further includes, in part, a current source, a PMOS transistor having first and second terminals coupled to the current source and the second node, a first NMOS transistor having a first terminal coupled to the second node and a second terminal coupled to a fourth node, and control circuitry coupled between the third node and the ground terminal and adapted to inhibit junction diodes of the first NMOS transistor from conducting current during boost cycles. In one embodiment, the control circuitry in each of the first and second legs may include a single PMOS transistor.

In one embodiment, the switch circuit includes, in part, a first resistor having a first terminal coupled to the first node, a second resistor having a first terminal coupled to the second node, a first NMOS transistor having a first terminal coupled to a second terminal of the first resistor, a second NMOS transistor having a first terminal coupled to a second terminal of the second resistor, and a first PMOS transistor coupled to the first and second NMOS transistors of the switch circuit.

In other embodiments, the switch circuit further includes a second PMOS transistor having a first terminal coupled to the second terminal of the second NMOS transistor of the switch circuit, and a second terminal coupled to a first terminal of the first PMOS transistor of the switch circuit. The second terminal of the first PMOS transistor of the switch circuit is coupled to the second terminal of the first NMOS transistor of the switch circuit. In some embodiments, the first and second resistors disposed in the switch circuit have the same resistance. Furthermore, the current sources in the first and second legs supply the same amount of current.

In accordance with another embodiment of the present invention, a driver circuit, includes, in part, means for flowing a first current during a steady state period through a first conduction path formed between the first and second nodes and through a writer head coupled across the first and second nodes; means for flowing a second current through a second conduction path disposed between the first and second nodes during the steady state period; and means for inhibiting the current flow through the second conduction path during a boost period.

Such embodiments may further include means for supplying the first and second currents from a positive voltage supply to the first node; means for sinking the first and second currents received by the second node to a ground terminal; means for supplying the first and second currents from the positive voltage supply to the second node; and means for sinking the first and second currents received by the first node to the ground terminal.

Such embodiments may further include means for inhibiting junction diodes of transistors used to sink current to the ground terminal from conducting current during the boost cycle. The current received by the first node may have the same level as the current received by the second node and the first and second resistors may have the same resistance. Such embodiments may further include means for supplying a third current to the first node during the boost cycle; and means for supplying a fourth current to the second node during the boost cycle. Each of the third and fourth currents is greater than the sum of the first and second currents. Furthermore, in some embodiments, the negative voltage supply has an absolute value that is different from the value of the positive voltage supply. Moreover, the third and the fourth currents may be equal.

In accordance with another embodiment of the present invention, a driver circuit, includes, in part, code for flowing a first current during a steady state period through a first conduction path formed between the first and second nodes and through a writer head coupled across the first and second nodes; code for flowing a second current through a second conduction path disposed between the first and second nodes during the steady state period; and code for inhibiting the current flow through the second conduction path during a boost period.

Such embodiments may further include code for supplying the first and second currents from a positive voltage supply to the first node; code for sinking the first and second currents received by the second node to a ground terminal; code for supplying the first and second currents from the positive voltage supply to the second node; and code for sinking the first and second currents received by the first node to the ground terminal.

Such embodiments may further include code for inhibiting junction diodes of transistors used to sink current to the ground terminal from conducting current during the boost cycle. The current received by the first node may have the same level as the current received by the second node and the first and second resistors may have the same resistance. Such embodiments may further include code for supplying a third current to the first node during the boost cycle; and code for supplying a fourth current to the second node during the boost cycle. Each of the third and fourth currents is greater than the sum of the first and second currents. Furthermore, in some embodiments, the negative voltage supply has an absolute value that is different from the value of the positive voltage supply. Moreover, the third and the fourth currents may be equal.

DETAILED DESCRIPTION OF THE INVENTION

Figure 4:
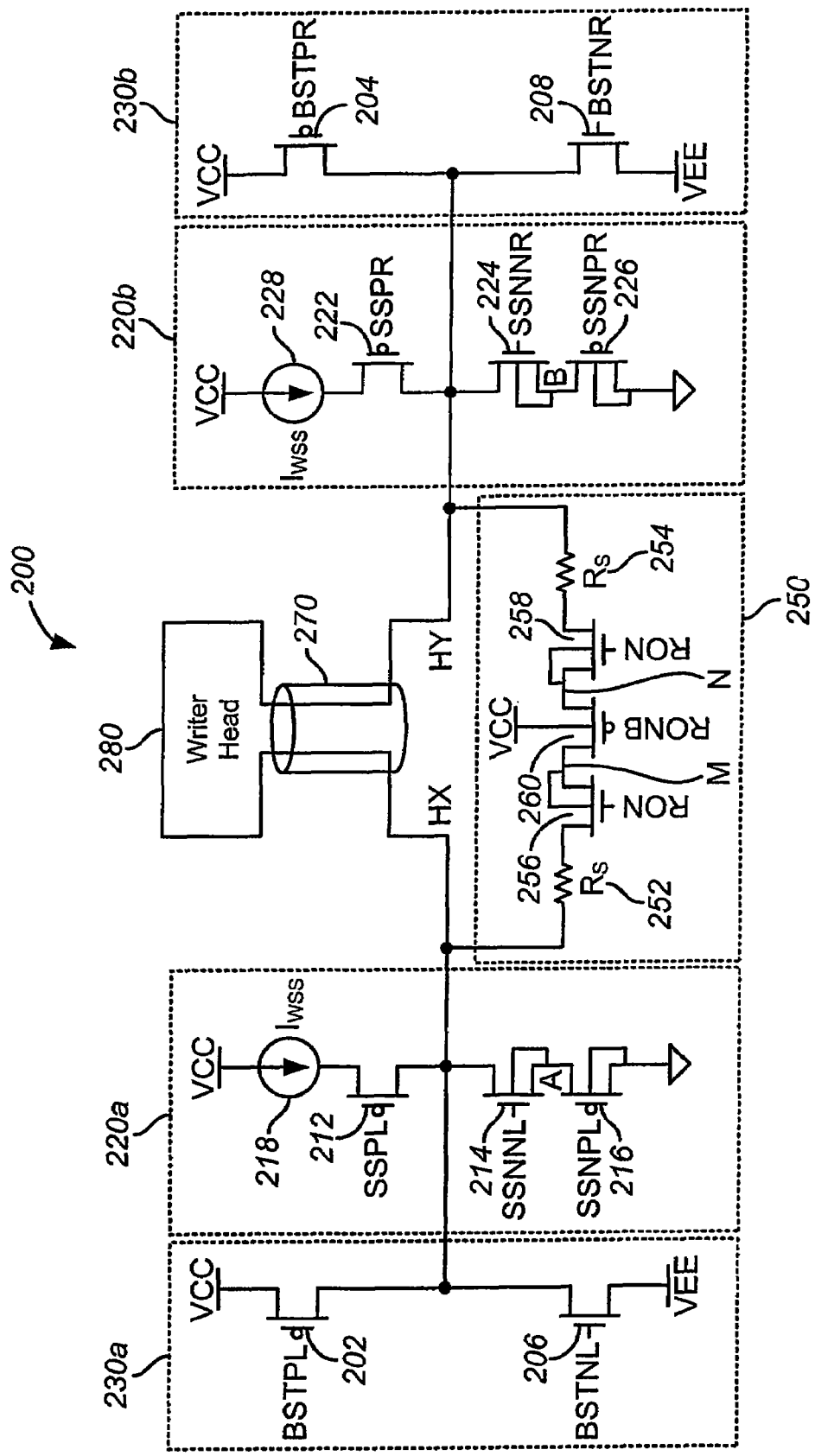
FIG. 4 is a transistor schematic diagram of a driver circuit adapted to drive a writer head, in accordance with one embodiment of the present invention.

FIG. 4 is a transistor schematic diagram of a driver circuit 200 adapted to supply current to a writer head 280 via nodes Hx and Hy and transmission line 270, in accordance with one embodiment of the present invention. Driver circuit 200 is shown as including, in part, legs 230a and 230b that operate during the boost periods, and legs 220a and 220b that operate during the steady state periods. Leg 230a includes PMOS transistor 202 and NMOS transistor 206 disposed between positive supply voltage $V_{CC}$ and negative supply voltage $V_{EE}$. Leg 230b includes PMOS transistor 204 and NMOS transistor 208 disposed between positive supply voltage $V_{CC}$ and negative supply voltage $V_{EE}$. Legs 230a and 230b collectively form a boost circuit that supply writer head 280 with a relatively high current during the boost periods. The current supplied to the writer head during the boost periods exceeds the steady state current and is adapted to provide the required magnetic flux change in an inductor (not shown) disposed in write head 280. Legs 220a and 220b together form an H-bridge.

Leg 220a includes current source 218, PMOS transistors 212, 216, and NMOS transistor 214. Current source 218 is coupled to supply voltage $V_{CC}$ and is adapted to supply a steady state current $I_{wss}$ to the source terminal of PMOS transistor 212. The drain terminal of PMOS transistor 212 is coupled to the drain terminal of NMOS transistor 214 and to node Hx. The source terminal of NMOS transistor 214 is coupled to the source terminal of PMOS transistor 216 whose drain terminal is coupled to the ground. The body terminal of transistor 214 is coupled to node A, and the body terminal of transistor 216 is coupled to the ground terminal. Leg 220*b* includes current source 228, PMOS transistors 222, 226, and NMOS transistor 204. Current source 228 is coupled to supply voltage $V_{CC}$ and is adapted to supply a steady state current $I_{wss}$ to the source terminal of PMOS transistor 222. The drain terminal of PMOS transistor 222 is coupled to the drain terminal of NMOS transistor 224 and to node Hy. The source terminal of NMOS transistor 224 is coupled to the source terminal of PMOS transistor 226 whose drain terminal is coupled to the ground. The body terminal of transistor 224 is coupled to node B, and the body terminal of transistor 226 is coupled to the ground terminal. In other embodiments, the drain terminals of transistors 216 and 226 may receive a voltage other than the ground voltage.

Driver circuit 200 is also shown as including, in part, a switch circuit 250 that is disposed between nodes Hx and Hy, and when activated, provides a current path between these two nodes. Exemplary embodiment 250 of this switch circuit is shown as including resistors 252, 254, NMOS transistors 256, 258 and PMOS transistor 260. Resistor 252 has a first terminal coupled to node Hx, and a second terminal coupled to one of the current carrying terminals of NMOS transistor 256. Resistor 254 has a first terminal coupled to node Hy, and a second terminal coupled to one of the current carrying terminals of NMOS transistor 258. The second current carrying terminal of transistor 256 is coupled to a first current carrying terminal of PMOS transistor 260 whose second current carrying terminal is coupled to the second current carrying terminal of transistor 258. Nodes Hx and Hy see a balanced load due to the symmetry provided by resistors 252, 254, as well as transistors 256, 258, 260 disposed in switch circuit 250. The body terminals of transistors 256 and 258 are coupled to nodes M and N respectively. The body terminal of transistor 260 is coupled to supply voltage $V_{CC}$.

During the steady state operation, either transistor 212 is turned on to supply current $I_{wss}$ to node Hx or transistor 222 is turned on to supply current $I_{wss}$ to node Hy. If transistor 212 is turned on, transistors 224 and 226 are also turned on and transistors 222, 214 and 216 are turned off or maintained off. Part of the current $I_{wss}$ supplied by current source 218 to node Hx—via transistor 212—reaches node Hy via writer head 280. The remaining part of this current reaches node Hy via switch circuit 250. Current $I_{wss}$ received by node Hy flows to the ground terminal via transistors 224 and 226.

If transistor 222 is turned on, transistors 214 and 216 are also turned on after the boost period and transistors 212, 224 and 226 are turned off or maintained off. Part of the current $I_{wss}$ supplied by current source 228 to node Hy—via transistor 222—reaches node Hx via writer head 280. The remaining part of this current reaches node Hy via switch circuit 250. Current $I_{wss}$ received by node Hx flows to the ground terminal via transistors 214 and 216.

PMOS transistor 216 ensures that during the boost periods, the bulk-to-source and bulk-to-drain junction diodes of transistor 214 is not turned on so as not to draw current from the ground. Similarly, PMOS transistor 226 ensures that the during the boost periods, the bulk-to-source and bulk-to-drain junction diodes of transistor 224 is not turned on so as not to draw current from the ground.

The power consumed by driver circuit 200 during the boost periods is defined by the following expression:

$$(V_{CC} - V_{EE})\left(\frac{I_1 \times T_B}{T_B + T_s}\right) \quad (3)$$

where $I_1$ represents the write current during the boost periods, $T_B$ represents the boost duration and $T_S$ represents the steady state duration. The power consumed by driver circuit 200 during the steady state periods is defined by the following expression:

$$V_{CC}\left(\frac{I_{wss} \times T_S}{T_B + T_s}\right) \quad (4)$$

Figure 1:
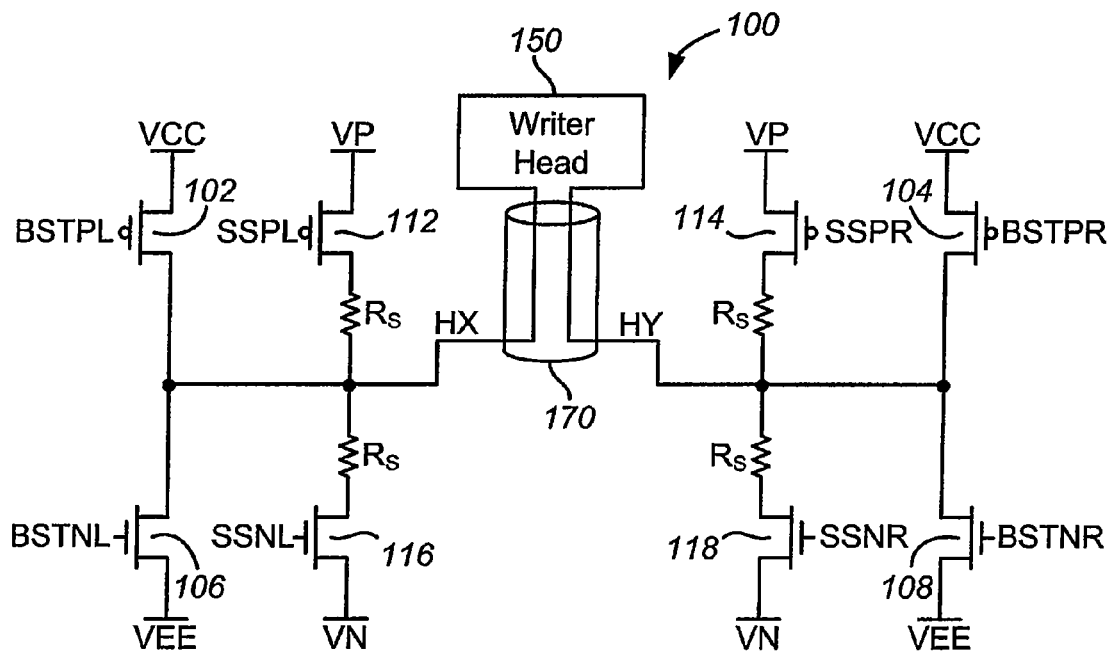
FIG. 1 is a transistor schematic diagram of a driver circuit adapted to drive a writer head, as known in the prior art.
Figure 2:
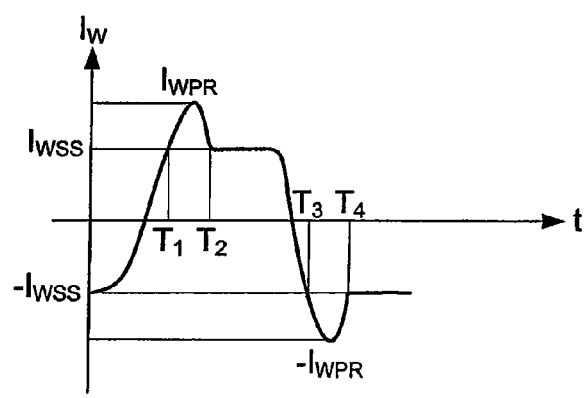
FIG. 2 shows the timing characteristic of the current supplied by the driver circuit of FIG. 1, as known in the prior art.
Figure 3:
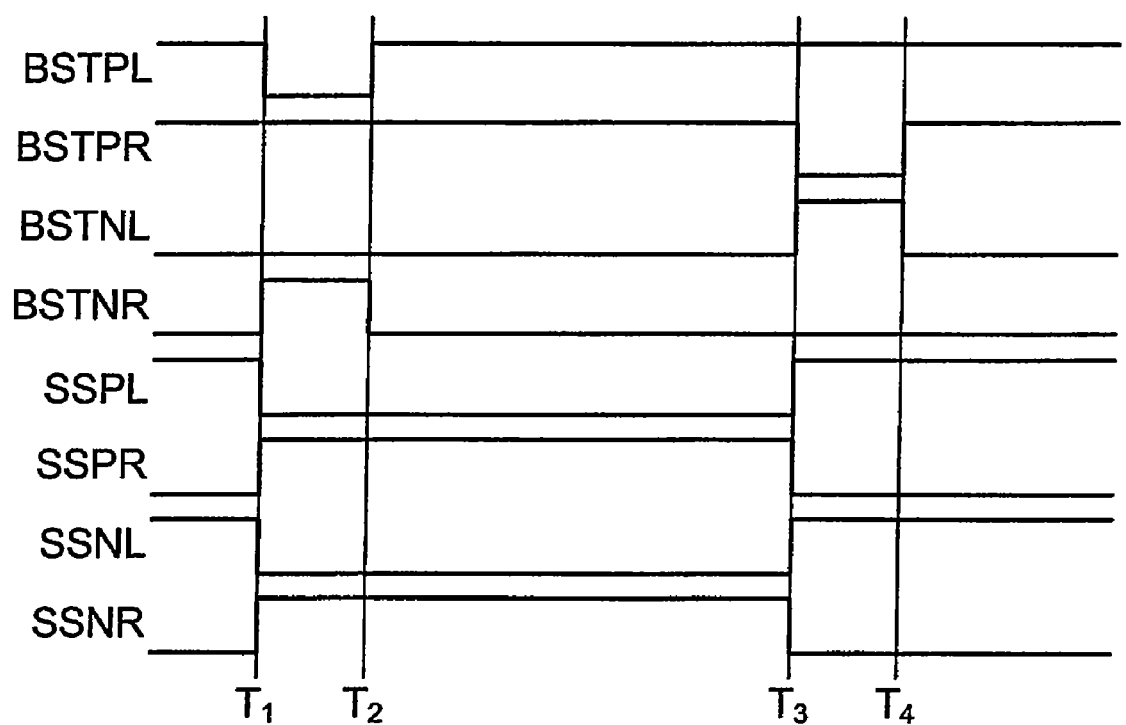
FIG. 3 is a timing diagram of a number of signals associated with the driver circuit of FIG. 1, as known in the prior art.

As seen from expression (4), during the steady state periods, the current consumption of exemplary embodiment 200 of the present invention, does not depend on any negative supply voltage. This is in contrast to the prior art driver circuit 100 shown in FIG. 1, whose current consumption during the steady state periods depends both on the positive supply voltage $V_{CC}$ as well as the negative supply voltage $V_{EE}$. Accordingly, driver circuit 200 of the present invention has a reduced current consumption relative to the prior art driver circuits.

Figure 5:
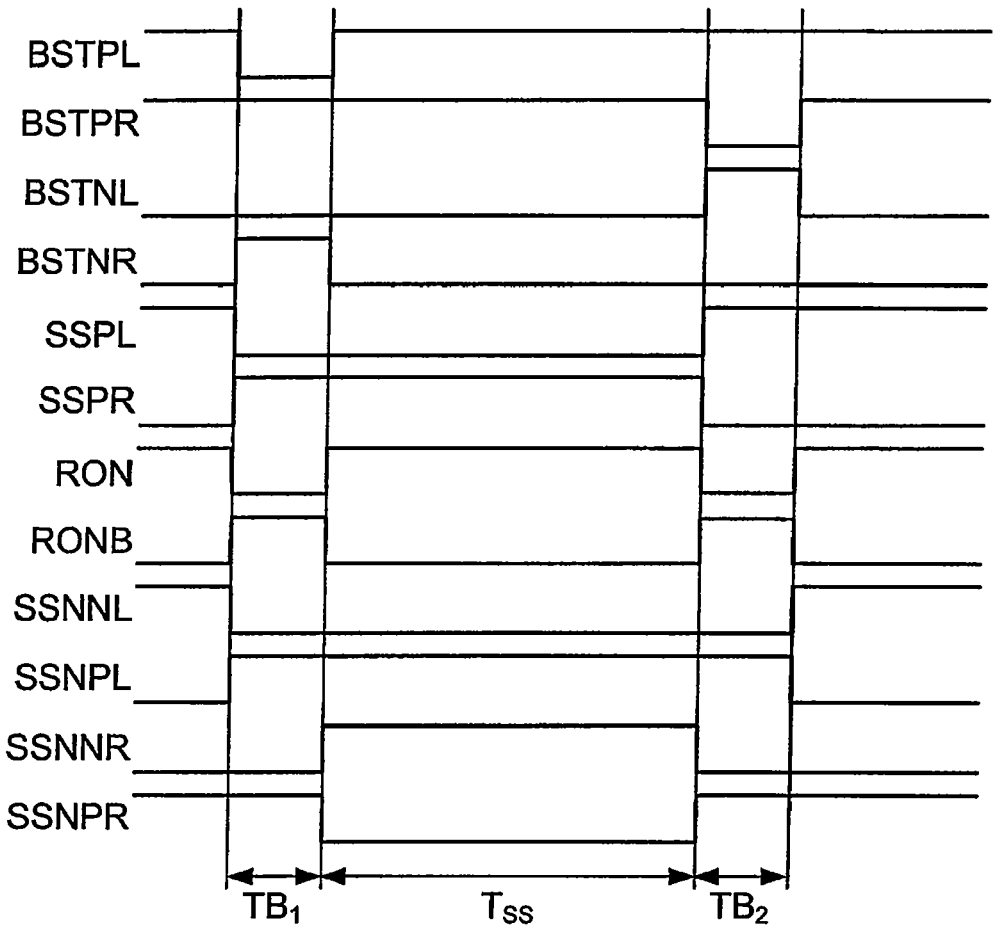
FIG. 5 is a timing diagram of a number of signals associated with driver circuit of FIG. 4, in accordance with one embodiment of the present invention.

FIG. 5 is a timing diagram of a number of signals associated with driver circuit 200. During the first boost period TB1, voltage signal BSTPL is lowered, voltage signal BSTNL is maintained low, voltage signal BSTPR is maintained high and voltage signal BSTNR is raised to a high level. Accordingly, transistors 202, 208 are turned on and transistors 204, 206 are turned off or maintained off. Therefore, a current path is established from supply voltage $V_{CC}$ to supply voltage $V_{EE}$ via transistors 202, 208, and writer head 280. Since during this period signal RON is at a low voltage level and signal RONB is at a high voltage level, transistors 256, 258 and 260 of switch circuit 250 are off thus inhibiting current flow from node Hx to node Hy via switch circuit 250.

During the second boost period TB2, voltage signal BSTPR is lowered, voltage signal BSTNR is maintained low, voltage signal BSTPL is maintained high and voltage signal BSTNL is raised to a high level. Accordingly, transistors 204, 206 are turned on and transistors 202, 208 are turned off or maintained off. Therefore, a current path is established from supply voltage $V_{CC}$ to supply voltage $V_{EE}$ via transistors 204, 206, and writer head 280. Since during this period signal RON is at a low voltage level and signal RONB is at a high voltage level, transistors 256, 258 and 260 of switch circuit 250 are off thus inhibiting current flow from node Hy to node Hx via switch circuit 250.

During the steady state period $T_{SS}$, boost transistors 202, 204, 206 and 208 are maintained off. Signals SSPL and SSPR are respectively at low and high voltage levels thereby causing transistor 212 to be on and transistor 222 to be off. Signals SSNNL and SSNPL are respectively at low and high voltage levels, thereby causing transistors 214 and 216 to be off. Signals SSNNR and SSNPR are respectively at high and low voltage levels, causing transistors 224 and 226 to be on. Because signals RON and RONB are respectively at high and low voltages, a current conduction path is formed between nodes Hx and Hy via switch circuit 250. Accordingly, current $I_{wss}$ is enabled to flow from node Hx to node Hy via both writer head 280 as well as switch circuit 250.

Current switch 250 is a bi-directional switch adapted to inhibit the flow of current between nodes Hx and Hy during boost cycles. Assume, for example, that positive voltage supply $V_{CC}$ supplies +5 volts and that negative voltage supply $V_{EE}$ supplies −3 volts. For simplicity, assume that the above voltages cause node Hy to be at −3 volts and node Hx to be at +5 volts during a boost cycle. Consequently, since signal Ron is at 0 volts, the gate of transistor 256 is at a lower voltage relative to its source; transistor 256 is thus off. Since the gate voltage of transistor 256 is one threshold voltage higher than its source voltage, transistor 258 is on. However, because the voltage at the gate of transistor 260 is less than its source voltage, transistor 260 is off thus inhibiting current flow between nodes Hx and Hy via switch circuit 250.

Further assume that at the beginning of a steady state period, nodes Hx and Hy are respectively at +5 volts and −3 volts. Accordingly, voltage signals RON and RONB are also at +5 volts and −3 volts. The application of these voltages cause transistors 256, 258 and 260 to be on, therefore forming a conduction path between nodes Hx and Hy via switch circuit 250. Switch circuit 250 acts as a termination structure to transmission line 270. The resistances of resistors 252 and 254, as well as the on-resistances of transistors 256, 258, and 260 are selected such that they provide impedance matching to transmission line 270.

Figure 6:
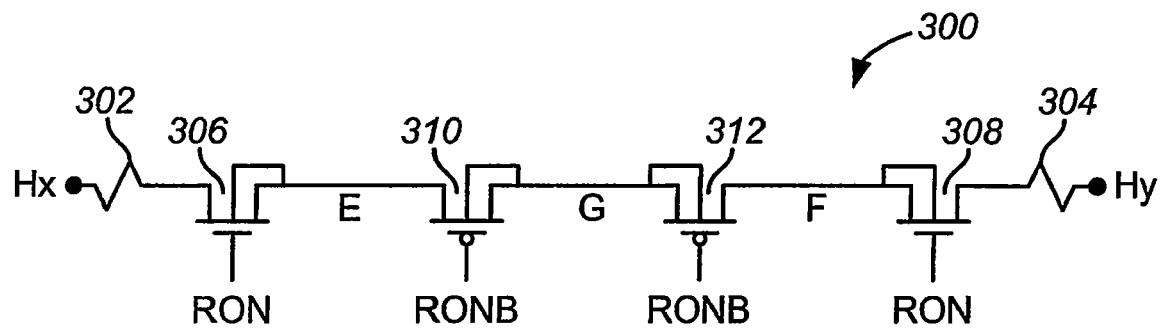
FIG. 6 is a transistor schematic diagram of another embodiment of a switch circuit disposed in the driver circuit of FIG. 4.

FIG. 6 is a transistor schematic diagram of a switch circuit 300 in accordance with another embodiment of the present invention, adapted for use in driver circuit 200 between nodes Hx and Hy. Switch circuit 300 is shown as including a pair of resistors 302, 304, a pair of NMOS transistors 306, 308, and a pair of PMOS transistors 310, 312. The gate terminals of transistors 306 and 308 are coupled to one another and receive voltage RON. The gate terminals of transistors 310 and 312 are coupled to one another and receive voltage RONB. The resistances of resistors 302 and 304, as well as the on-resistances of transistors 306, 310, 312, and 308 are selected such that they provide impedance matching to transmission line 270. If the supply voltage $V_{CC}$ is greater than a known value switch circuit 300 is used, and if the supply voltage $V_{CC}$ is smaller than a known value switch circuit 250 is used. The body terminals of transistors 306 and 308 are respectively coupled to nodes E and F. The body terminals of transistors 310 and 312 are coupled to node G, as shown in FIG. 6.

Figure 7A:
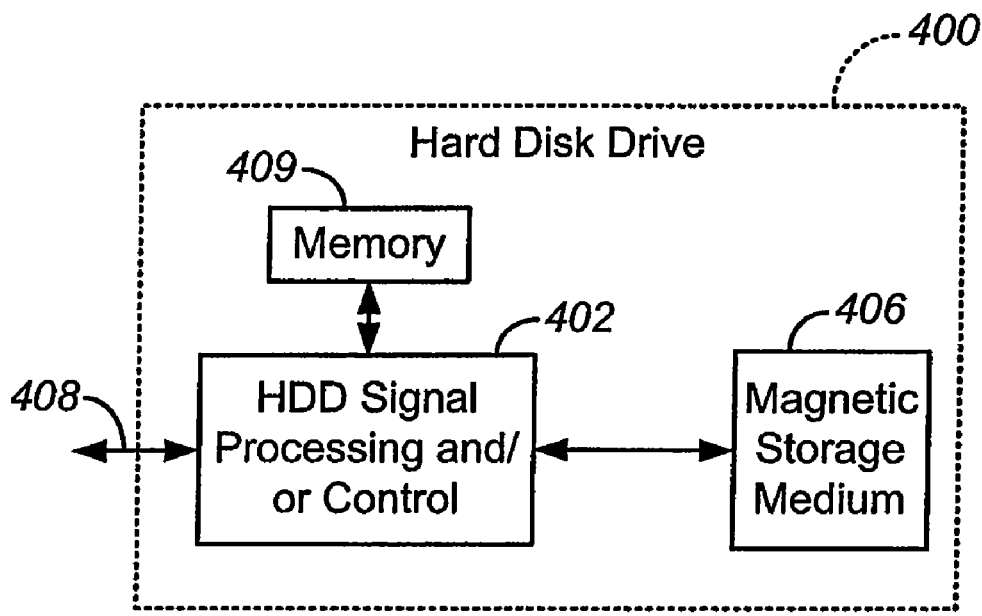
FIGS. 7A-7H show various devices in which the present invention may be embodied.

Referring now to FIGS. 7A-7G, various exemplary implementations of the present invention are shown. Referring to FIG. 7A, the present invention may be embodied in a hard disk drive 400. The present invention may implement either or both signal processing and/or control circuits, which are generally identified in FIG. 7A at 402. In some implementations, signal processing and/or control circuit 402 and/or other circuits (not shown) in HDD 400 may process data, perform coding and/or encryption, perform calculations, and/or format data that is output to and/or received from a magnetic storage medium 406.

HDD 400 may communicate with a host device (not shown) such as a computer, mobile computing devices such as personal digital assistants, cellular phones, media or MP3 players and the like, and/or other devices via one or more wired or wireless communication links 408. HDD 400 may be connected to memory 409, such as random access memory (RAM), a low latency nonvolatile memory such as flash memory, read only memory (ROM) and/or other suitable electronic data storage.

Figure 7B:
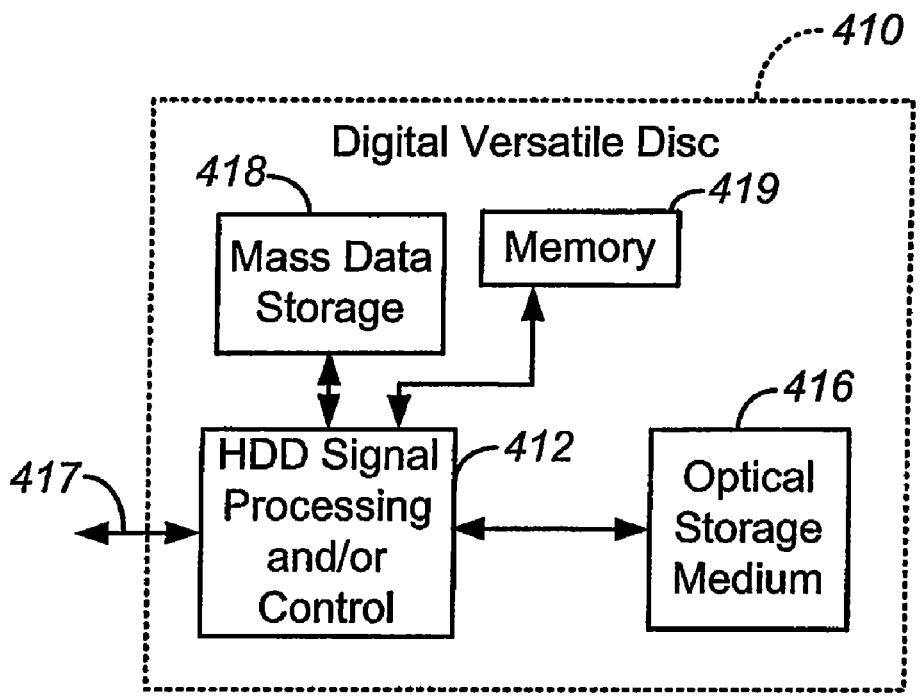

Referring now to FIG. 7B, the present invention may be embodied in a digital versatile disc (DVD) drive 410. The present invention may implement either or both signal processing and/or control circuits, which are generally identified in FIG. 7B at 412, and/or mass data storage 418 of DVD drive 410. Signal processing and/or control circuit 412 and/or other circuits (not shown) in DVD 410 may process data, perform coding and/or encryption, perform calculations, and/or format data that is read from and/or data written to an optical storage medium 416. In some implementations, signal processing and/or control circuit 412 and/or other circuits (not shown) in DVD 410 can also perform other functions such as encoding and/or decoding and/or any other signal processing functions associated with a DVD drive.

DVD drive 410 may communicate with an output device (not shown) such as a computer, television or other device via one or more wired or wireless communication links 417. DVD 410 may communicate with mass data storage 418 that stores data in a nonvolatile manner. Mass data storage 418 may include a hard disk drive (HDD) such as that shown in FIG. 7A. The HDD may be a mini HDD that includes one or more platters having a diameter that is smaller than approximately 1.8". DVD 410 may be connected to memory 419, such as RAM, ROM, low latency nonvolatile memory such as flash memory, and/or other suitable electronic data storage.

Figure 7C:
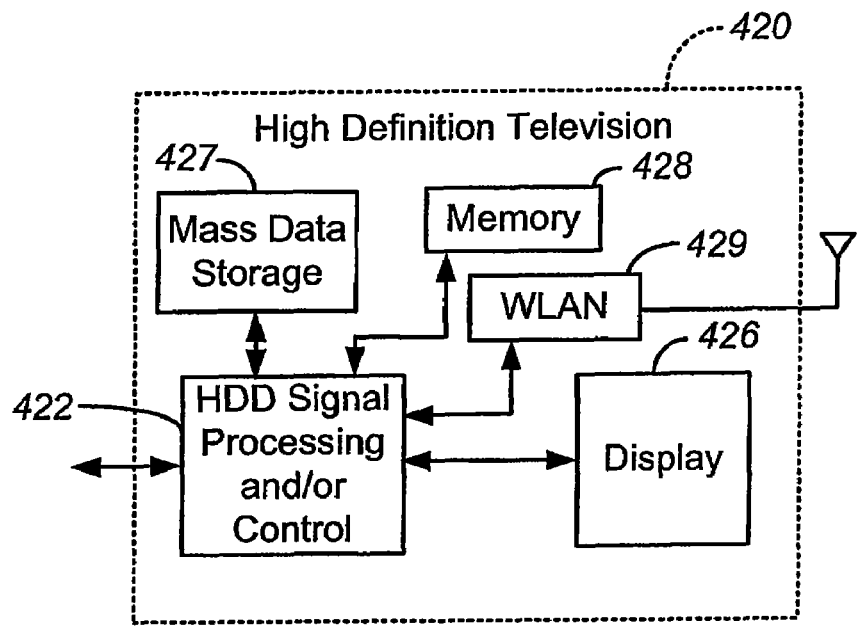

Referring now to FIG. 7C, the present invention may be embodied in a high definition television (HDTV) 420. The present invention may implement either or both signal processing and/or control circuits, which are generally identified in FIG. 7C at 422, a WLAN interface and/or mass data storage of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in FIG. 7A and/or at least one DVD may have the configuration shown in FIG. 7B. The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429.

Figure 7D:
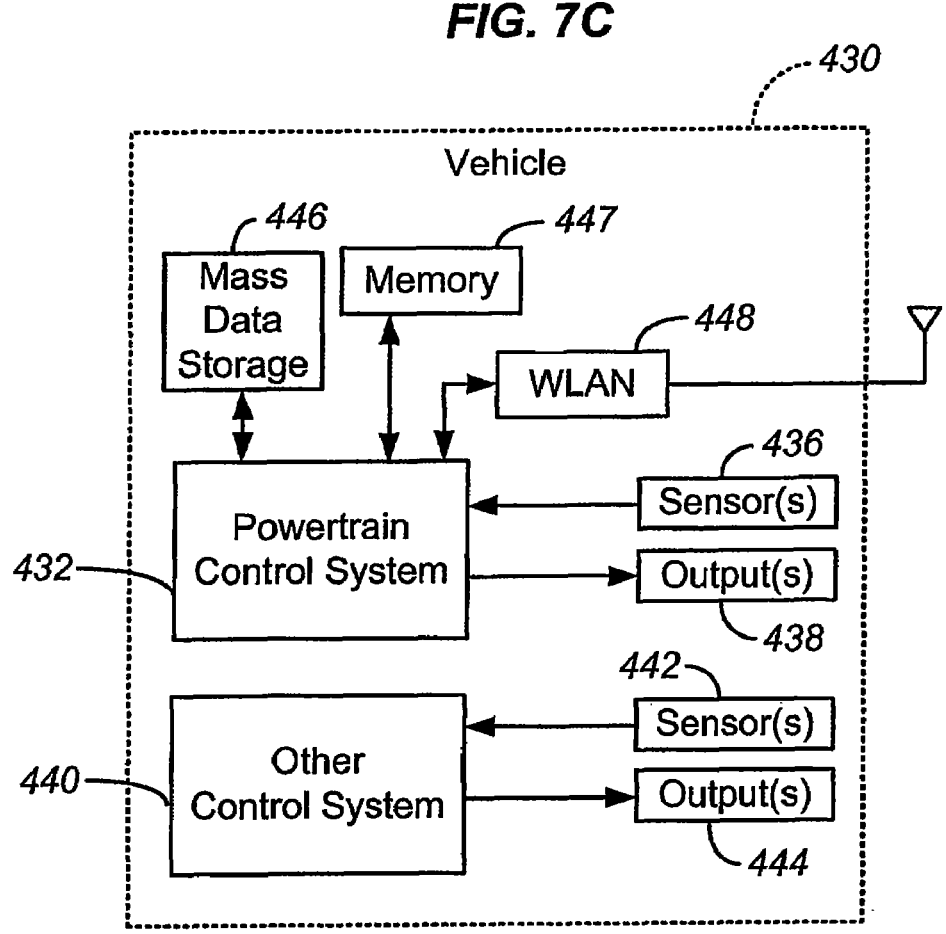

Referring now to FIG. 7D, the present invention implements a control system of a vehicle 430, a WLAN interface and/or mass data storage of the vehicle control system. In some implementations, the present invention implements a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 440 of vehicle 430. Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices for example hard disk drives HDD and/or DVDs. At least one HDD may have the configuration shown in FIG. 7A and/or at least one DVD may have the configuration shown in FIG. 7B. The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448. The control system 440 may also include mass data storage, memory and/or a WLAN interface (all not shown).

Figure 7E:
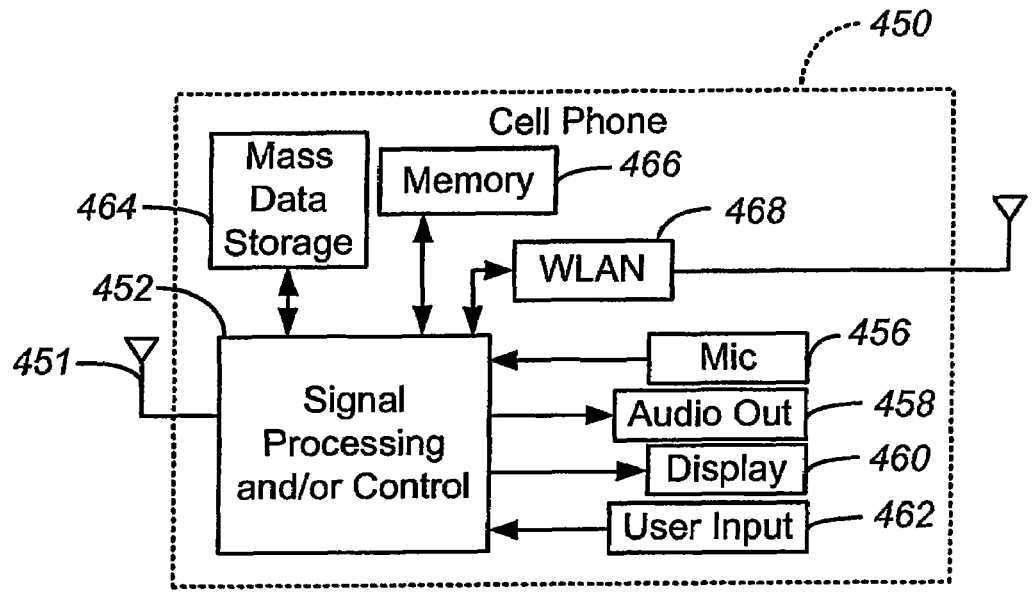

Referring now to FIG. 7E, the present invention may be embodied in a cellular phone 450 that may include a cellular antenna 451. The present invention may implement either or both signal processing and/or control circuits, which are generally identified in FIG. 7E at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. At least one HDD may have the configuration shown in FIG. 7A and/or at least one DVD may have the configuration shown in FIG. 7B. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 7F:
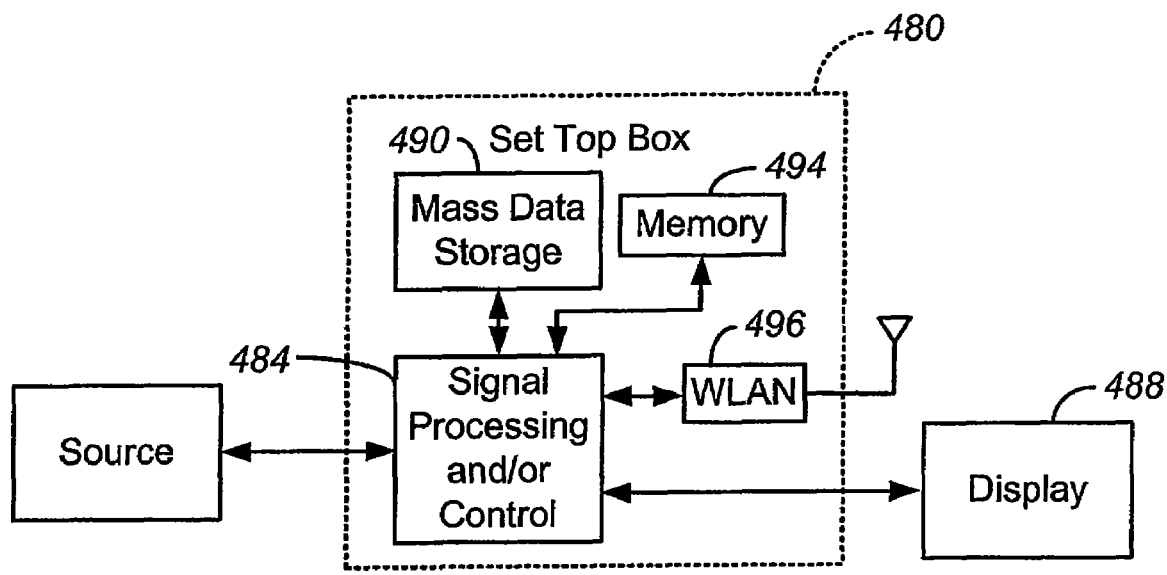

Referring now to FIG. 7F, the present invention may be embodied in a set top box 480. The present invention may implement either or both signal processing and/or control circuits, which are generally identified in FIG. 7F at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices for example hard disk drives HDD and/or DVDs. At least one HDD may have the configuration shown in FIG. 7A and/or at least one DVD may have the configuration shown in FIG. 7B. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496.

Figure 7G:
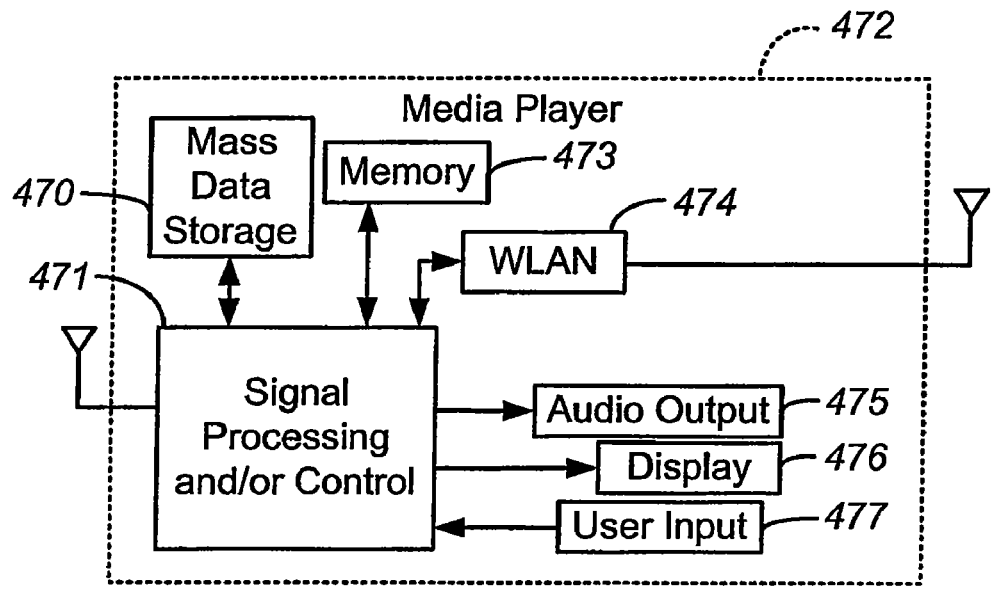

Referring now to FIG. 7G, the present invention may be embodied in a media player 472. The present invention may implement either or both signal processing and/or control circuits, which are generally identified in FIG. 7G at 471, a WLAN interface and/or mass data storage of the media player 472. In some implementations, media player 472 includes a display 476 and/or a user input 477 such as a keypad, touchpad and the like. In some implementations, media player 472 may employ a graphical user interface (GUI) that typically employs menus, drop down menus, icons and/or a point-and-click interface via display 476 and/or user input 477. Media player 472 further includes an audio output 475 such as a speaker and/or audio output jack. Signal processing and/or control circuits 471 and/or other circuits (not shown) of media player 472 may process data, perform coding and/or encryption, perform calculations, format data and/or perform any other media player function.

Media player 472 may communicate with mass data storage 470 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 7A and/or at least one DVD may have the configuration shown in FIG. 7B. The HDD may be a mini HDD that includes one or more platters having a diameter that is smaller than approximately 1.8". Media player 472 may be connected to memory 473 such as RAM, ROM, low latency nonvolatile memory such as flash memory and/or other suitable electronic data storage. Media player 472 also may support connections with a WLAN via a WLAN network interface 474.

Figure 7H:
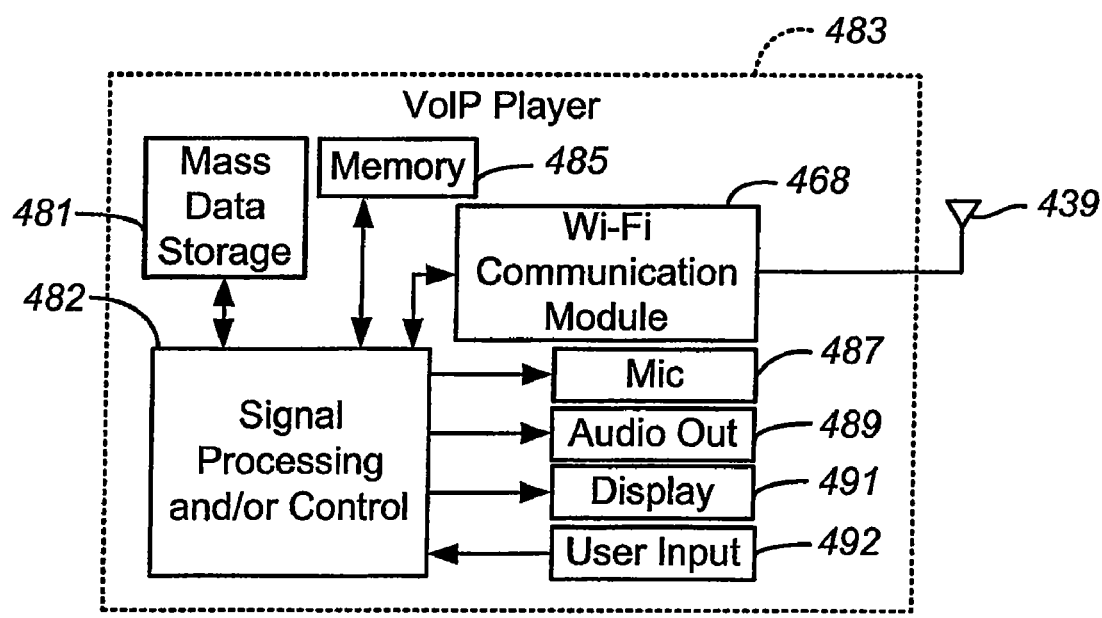

Referring to FIG. 7H, the present invention may be embodied in a Voice over Internet Protocol (VoIP) phone 483 that may include an antenna 439. The present invention may implement either or both signal processing and/or control circuits, which are generally identified in FIG. 7H at 482, a wireless interface and/or mass data storage of the VoIP phone 483. In some implementations, VoIP phone 483 includes, in part, a microphone 487, an audio output 489 such as a speaker and/or audio output jack, a display monitor 491, an input device 492 such as a keypad, pointing device, voice actuation and/or other input devices, and a Wireless Fidelity (Wi-Fi) communication module 486. Signal processing and/or control circuits 482 and/or other circuits (not shown) in VoIP phone 483 may process data, perform coding and/or encryption, perform calculations, format data and/or perform other VoIP phone functions.

VoIP phone 483 may communicate with mass data storage 502 that stores data in a nonvolatile manner such as optical and/or magnetic storage devices, for example hard disk drives HDD and/or DVDs. At least one HDD may have the configuration shown in FIG. 7A and/or at least one DVD may have the configuration shown in FIG. 7B. The HDD may be a mini HDD that includes one or more platters having a diameter that is smaller than approximately 1.8". VoIP phone 483 may be connected to memory 485, which may be a RAM, ROM, low latency nonvolatile memory such as flash memory and/or other suitable electronic data storage. VoIP phone 483 is configured to establish communications link with a VoIP network (not shown) via Wi-Fi communication module 486. Still other implementations in addition to those described above are contemplated.

The above embodiments of the present invention are illustrative and not limitative. Various alternatives and equivalents are possible. The invention is not limited by the type of integrated circuit in which the present disclosure may be disposed. Nor is the invention limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A circuit adapted to drive a writer head disposed between first and second nodes respectively associated with a first part and a second part of a bridge, the writer head providing a first current conduction path between the first and second nodes, the circuit comprising:
    first circuitry coupled between a first reference voltage and a second reference voltage, the first circuitry configured to control current at the first node during a steady state period;
    second circuitry coupled between the first and second reference voltages and configured to control current at the second node during the steady state period; and
    a switch circuit coupled between the first and second nodes and configured to establish a second current conduction path between the first and second nodes during the steady state period and further configured to inhibit current flow in the second current conduction path during a boost period.

2. The circuit of claim 1 wherein the first circuitry comprises:
    a first current source;
    a first transistor having first and second terminals disposed between the first current source and the first node;
    a second transistor having a second transistor first terminal coupled to the first node and a second transistor second terminal coupled to a third node; and
    third circuitry coupled between the third node and the second reference voltage and configured to inhibit junction diodes of the second transistor from conducting current during the boost period.

3. The circuit of claim 2 wherein the second circuitry comprises:
    a second current source;
    a third transistor having third transistor first and second terminals disposed between the second current source and the second node;
    a fourth transistor having a fourth transistor first terminal coupled to the second node and a fourth transistor second terminal coupled to a fourth node; and
    fourth circuitry coupled between the fourth node and the second reference voltage and configured to inhibit junction diodes of the fourth transistor from conducting current during the boost period.

4. The circuit of claim 3 wherein the fourth circuitry includes a sixth transistor having a sixth transistor first terminal coupled to the fourth node and a sixth transistor second terminal coupled to the second reference voltage.

5. The circuit of claim 2 wherein the third circuitry includes a fifth transistor having a fifth transistor first terminal coupled to the third node and a fifth transistor second terminal coupled to the second reference voltage.

6. The circuit of claim 1 wherein the switch circuit comprises:
    a first resistive element having a first resistive element first terminal coupled to the first node;
    a second resistive element having a second resistive element first terminal coupled to the second node;
    a first transistor having a first transistor first terminal coupled to a first resistive element second terminal;
    a second transistor having a second transistor first terminal coupled to a second resistive element second terminal; and
    a third transistor coupled to the first and second transistors of the switch circuit.

7. The circuit of claim 6 wherein the switch circuit further comprises:
    a fourth transistor having a fourth transistor first terminal coupled to a second transistor second terminal of the second transistor, and a fourth transistor second terminal coupled to a third transistor first terminal of the third transistor.

8. The circuit of claim 1 further comprising:
    third circuitry coupled between the first and second reference voltages and configured to control current at the first node during the boost period; and
    fourth circuitry coupled between the first and second reference voltages and configured to control current at the second node during the boost period.

9. The circuit of claim 8 wherein the third circuitry further comprises:
    a first transistor having a first transistor first terminal coupled to the first reference voltage and a first transistor second terminal coupled to the first node; and
    a second transistor having a second transistor first terminal coupled to the first node and a second transistor second terminal coupled to the second reference voltage.

10. The circuit of claim 9 wherein the fourth circuitry further comprises:
    a third transistor having a third transistor first terminal coupled to the first reference voltage and a third transistor second terminal coupled to the second node; and
    a fourth transistor having a fourth transistor first terminal coupled to the second node and a fourth transistor second terminal coupled to the second reference voltage.

11. The circuit of claim 1 wherein the second reference voltage is a ground voltage.

12. A method of operating a writer head disposed between first and second nodes respectively associated with a first part and a second part of a bridge, the method comprising:
    controlling, by first circuitry, a first current through a first conduction path formed between the first and second nodes and through the writer head during a first period;
    controlling, by second circuitry, a second current through a second conduction path disposed between the first and second nodes during a second period; and
    inhibiting, by a switch, current flow through the second conduction path during a third period.

13. The method of claim 12 further comprising:
    sourcing the first and second currents from a positive voltage supply to the first node; and
    sinking the first and second currents received by the second node to a ground terminal.

14. The method of claim 12 further comprising:
    sourcing the first and second currents from a positive voltage supply to the second node; and sinking the first and second currents received by the first node to a ground terminal.

15. The method of claim 12 further comprising:
inhibiting diode turn-on during a boost cycle.

16. The method of claim 12 further comprising:
sourcing a third current to the first node during a boost period wherein the third current is greater than a sum of the first and second currents.

17. The method of claim 12 further comprising:
sourcing a third current to the second node during a boost period wherein the third current is greater than a sum of the first and second currents.

18. The method of claim 12 wherein the first and second currents are sunk to a first reference voltage having an absolute value that is different from a value of a second reference voltage.

19. The method of claim 12 wherein the first and the second periods comprise a steady state period and the third period comprises a boost period.

20. The method of claim 12 wherein the first and the second periods comprise a same period.

* * * * *